May 25, 1943.  W. DE BACK  2,319,900
APPARATUS FOR PACKING FOODSTUFFS IN CANS
Filed Dec. 13, 1940   8 Sheets-Sheet 2
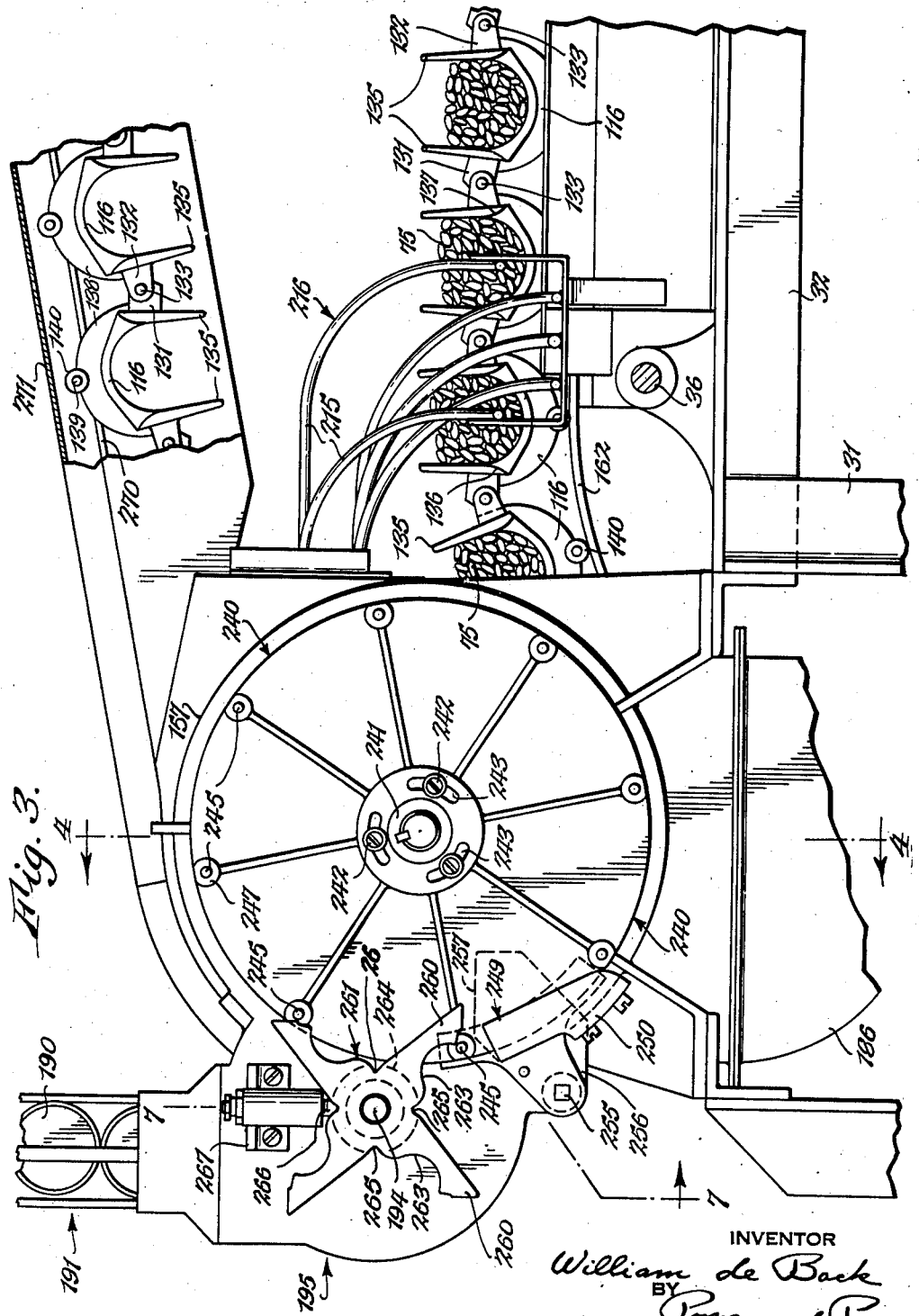
INVENTOR
William de Back
BY
Pope and Pope
ATTORNEYS

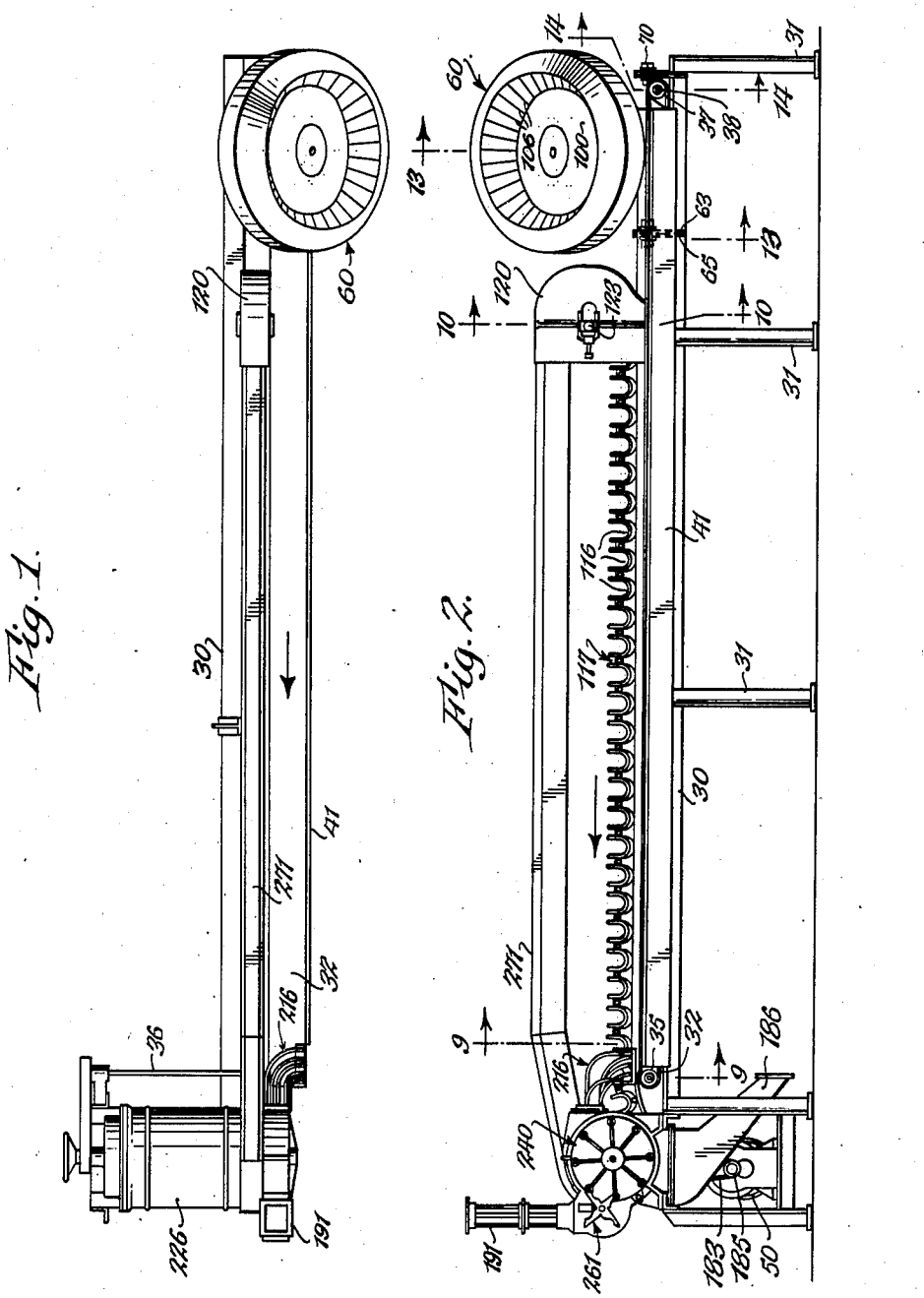

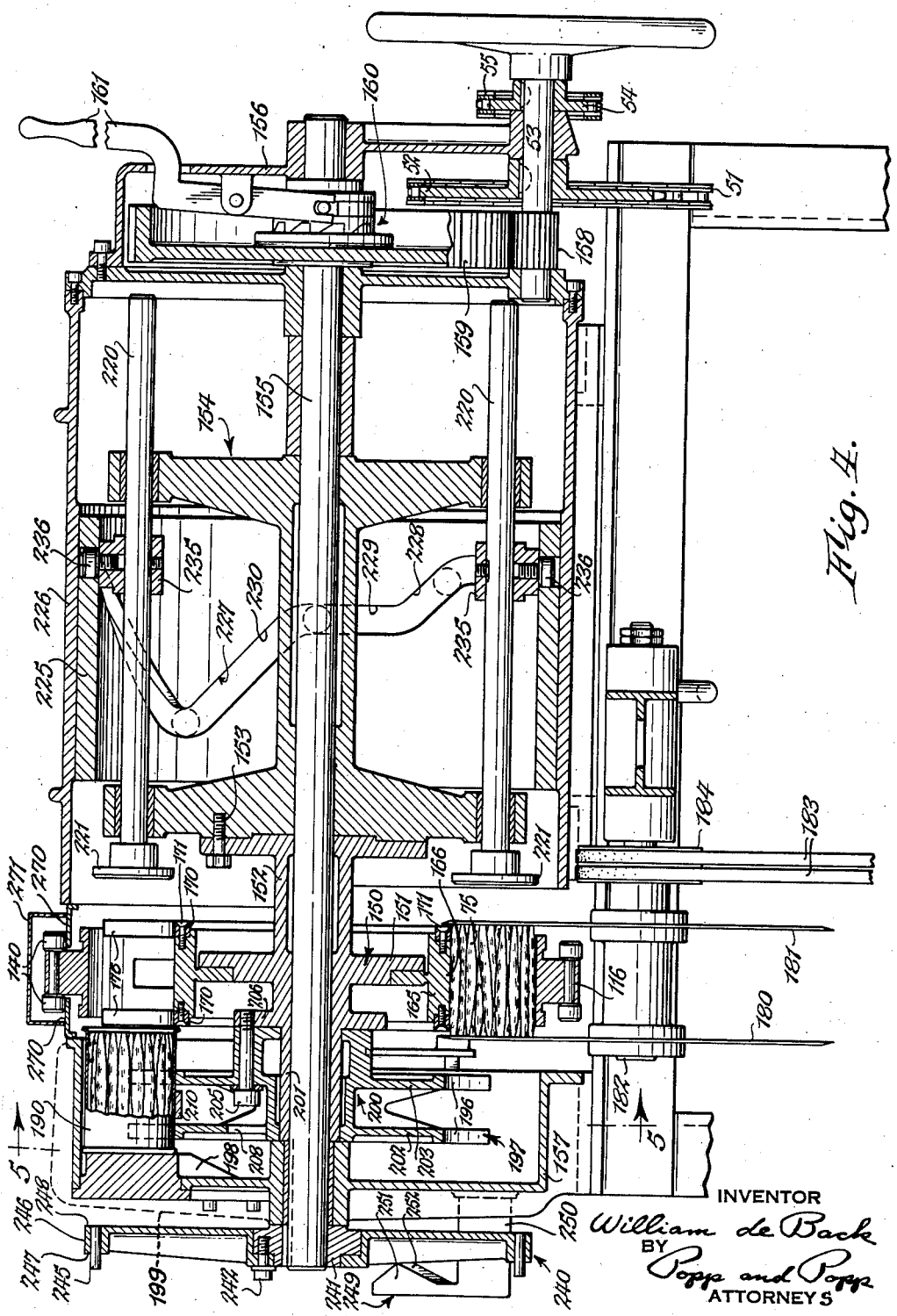

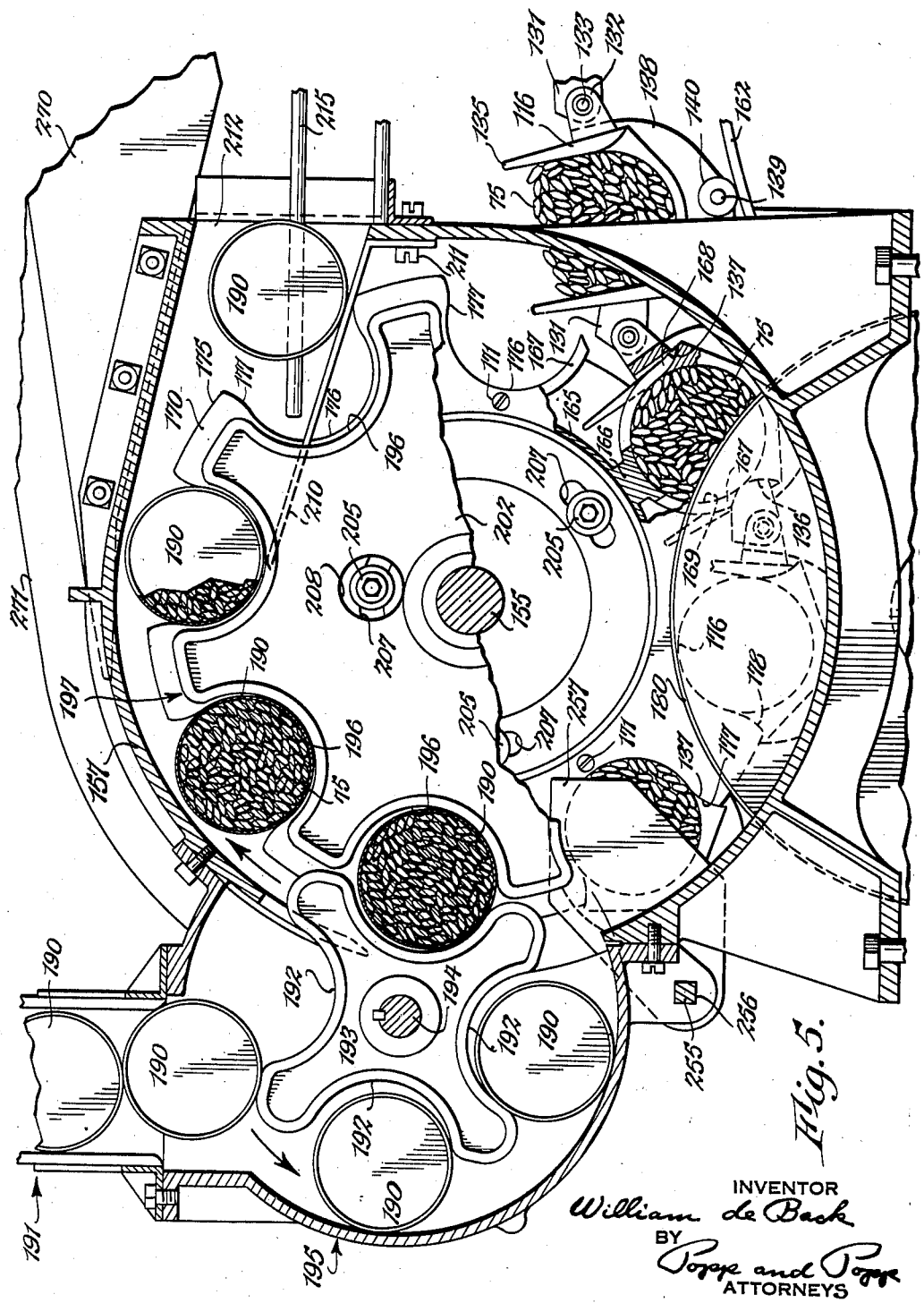

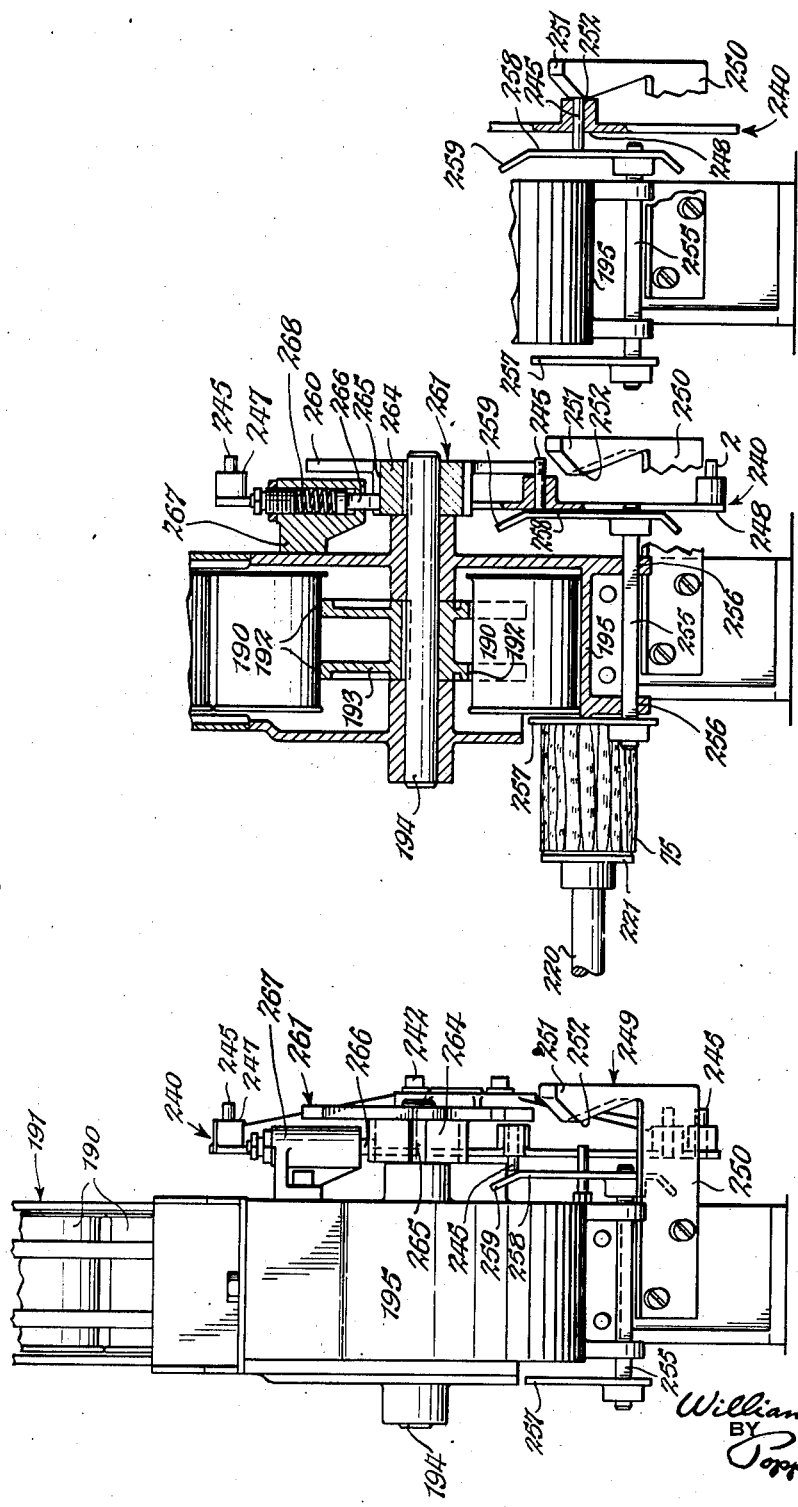

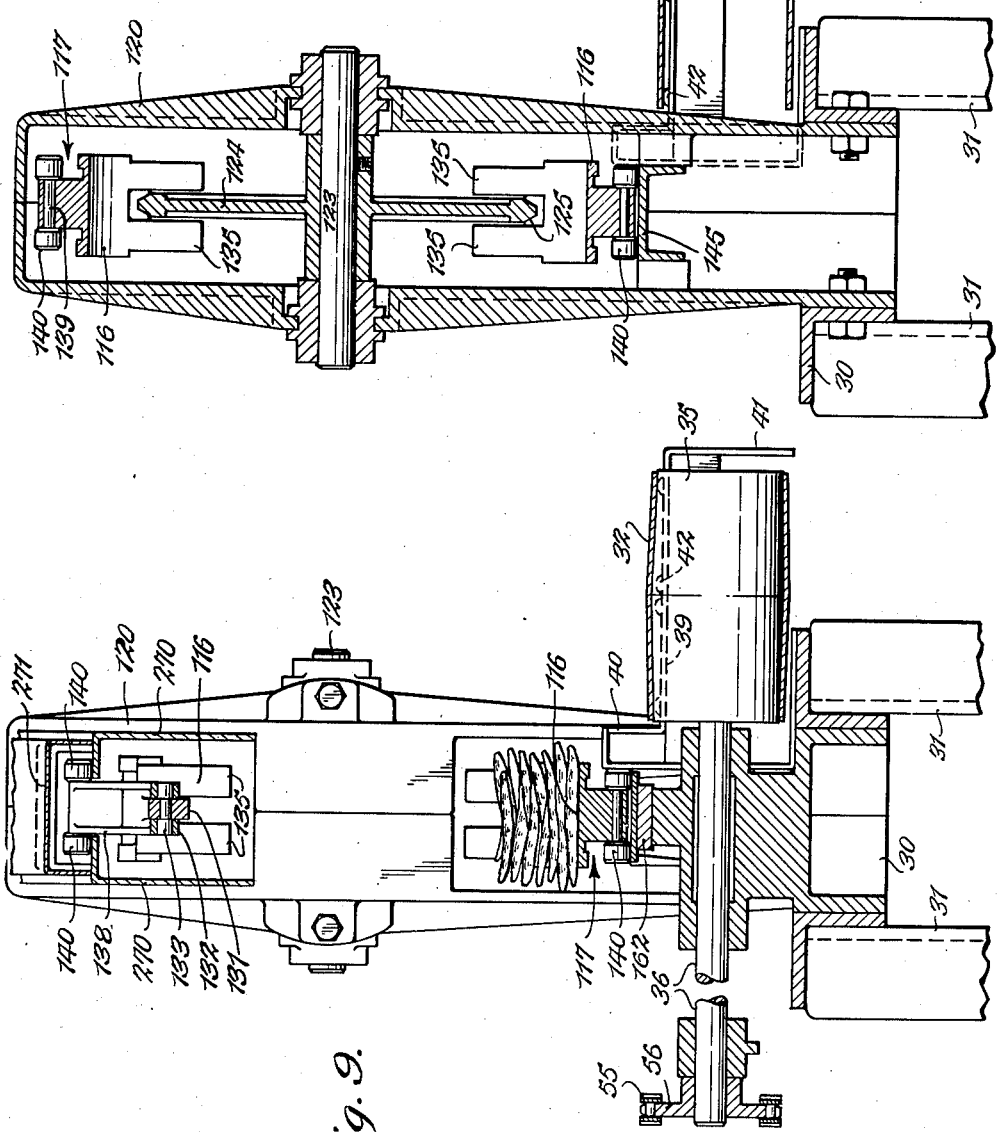

May 25, 1943.  W. DE BACK  2,319,900
APPARATUS FOR PACKING FOODSTUFFS IN CANS
Filed Dec. 13, 1940   8 Sheets-Sheet 7

INVENTOR
William de Back
BY
Popp and Popp
ATTORNEYS

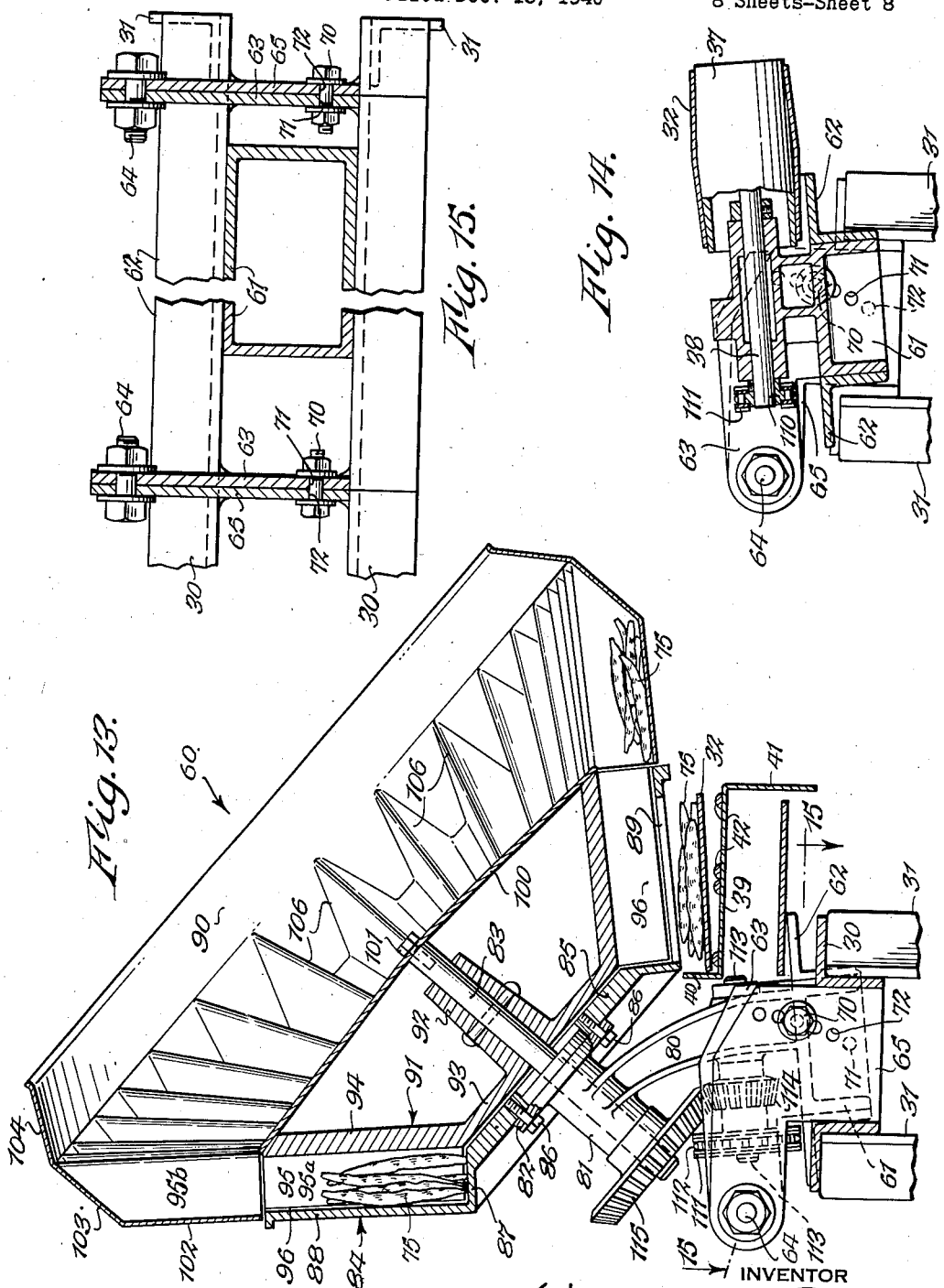

Patented May 25, 1943

2,319,900

UNITED STATES PATENT OFFICE 2,319,900

APPARATUS FOR PACKING FOODSTUFFS IN CANS

William de Back, Niagara Falls, N. Y., assignor to Chisholm-Ryder Company, Incorporated, Niagara Falls, N. Y., a corporation of New York Application December 13, 1940, Serial No. 370,051

24 Claims. (Cl. 226—101)

This invention relates to an apparatus for packing foodstuffs and more particularly to an apparatus of the general type shown in the De Back Patent No. 2,180,349, dated November 21, 1939, which is designed to mold and transfer into cans elongated vegetables such as corn on the cob, string beans, carrots, etc., in the so-called "asparagus" type of pack.

One of the principal objects of the invention is to provide such a machine for molding and transferring into cans elongated vegetables, such as string beans, in which a series of part molds are carried by an endless flexible conveyer which permits of filling the molds by hand by a number of operators along a horizontal stretch of the conveyer, and in which the part molds project inwardly from said conveyer so as to be capable of cooperation with the part molds of a molding wheel around which the conveyer is passed, the vegetables being molded into the desired form in the cavities jointly provided by the part molds of the conveyer and the molding wheel.

Another object is to provide such a machine in which the molding wheel is a combined driving sprocket and molding wheel to rotatably support one end of the endless flexible conveyer and to compress the foodstuffs into the part molds of said flexible conveyer as they are successively brought into cooperative relation therewith.

Another object is to provide such a machine in which the molding wheel is a combined driving sprocket and molding wheel having, for this purpose, a plurality of molding fingers which engage, support and drive the part molds of the endless flexible conveyer as they are successively presented to the combined driving sprocket and molding wheel whereby said fingers serve as the sprocket teeth for supporting and driving the endless flexible conveyer and also as the means for compressing the foodstffs into the part molds of the endless flexible conveyer preparatory to being transferred into cans.

Another object of the invention is to provide such a machine in which a positive and reliable drive is provided between the combined driving sprocket and molding wheel and the part molds carried by the endless flexible conveyer, the combined driving sprocket and molding wheel being provided for this purpose with a series of molding fingers having curved driving faces at their ends, which curved end driving faces are adapted to engage similarly curved faces provided on each of the part molds carried by the endless flexible conveyer.

Another object is to provide such a machine which insures accurate molding of the foodstuffs, the molding fingers on the combined driving sprocket and molding wheel for this purpose interlacing with stacking fingers provided on the part molds carried by the flexible endless conveyer and engaging curved driving faces provided at the bases of the stacking fingers.

Another object is to provide such a machine in which the endless flexible conveyer and the part molds carried thereby are in the form of a chain of one piece molds connected together by pins and in which the one piece molds are of such form as to freely pass around both the combined driving sprocket and molding wheel and an idler which support the chain of molds so as to provide upper and lower stretches therein.

Another object is to provide such a machine in which the filling of the part molds is facilitated by providing rollers on each half mold and by supporting the rollers of the lower stretch of the chain of molds upon a horizontal track which is also formed to lead the part molds successively into proper engagement with the combined driving sprocket and molding wheel.

Another object is to provide such a machine having a chain of part molds provided with supporting rollers in which the upper stretch of the chain is adequately guarded by the provision of a covered track which supports the rollers of said part molds while traversing the upper stretch of the chain.

Another object is to provide a compact and simple mechanism for trimming the ends of the foodstuffs projecting from the passing molds to the length desired for insertion into the cans.

Another object is to provide a simple, compact and reliable means for preventing unfilled cans from being discharged from the machine, a can feeding device being provided for this purpose which is actuated in response to the presence of foodstuffs in each mold, so that no empty cans are presented to those molds which are not filled.

Another object of the invention is to provide such a machine in which the mechanism for actuating the can feeding mechanism to feed cans to opposite molds filled with foodstuffs and to withhold cans from molds not so filled is actuated from the same shaft which carries the combined driving sprocket and molding wheel, the can wheel and the turret carrying the plungers for transferring the foodstuffs into the cans, this arrangement greatly facilitating the synchronization of these various mechanisms.

Another object is to provide such a machine which includes a continuously moving chain of part molds having a horizontal filling stretch in which the filling of the molds on this stretch is expedited, this being effected by the provision of a feeding belt moving parallel with the filling stretch of the endless chain of molds and supplying the beans or the like to the operators for ready transfer to the part molds.

Another object is to provide such a machine in which the beans or the like are supplied to the feeding belt in groups of parallel beans, to facilitate the gathering of the beans, the machine including for this purpose a bean straightener which delivers the beans directly to the feeding conveyer in such aggroupment.

Another object of the invention is to provide such a machine in which the drive for the bean straightener is simplified, this being accomplished by driving the bean straightener through power derived from the driven pulley of the feeding belt.

In the accompanying drawings:

Fig. 1 is a top plan view of a machine made in accordance with my invention for packing string beans.

Fig. 2 is a side elevation thereof.

Fig. 3 is an enlarged fragmentary side elevation of the left hand of the machine as viewed in Fig. 2.

Fig. 4 is a fragmentary vertical transverse section, taken on line 4—4, Fig. 3.

Fig. 5 is a fragmentary, vertical, longitudinal section taken on line 5—5, Fig. 4.

Fig. 6 is a fragmentary end view of the machine viewed from the left of Fig. 2.

Fig. 7 is a fragmentary, vertical, transverse section, taken on line 7—7, Fig. 3.

Fig. 8 is a fragmentary, vertical, transverse section generally similar to Fig. 7 and showing a different position of the parts.

Figs. 9 and 10 are fragmentary, vertical, transverse sections, taken on the correspondingly numbered lines on Fig. 2.

Fig. 11 is a fragmentary perspective view of the combined driving sprocket and molding wheel.

Fig. 12 is a companion fragmentary perspective view of one of the part molds of the chain of part molds which traverses the combined driving sprocket and molding wheel.

Figs. 13 and 14 are fragmentary, vertical, transverse sections taken on the correspondingly numbered lines on Fig. 2.

Fig. 15 is a horizontal fragmentary section, taken on line 15—15, Fig. 13.

The invention is shown as comprising a machine for packing string beans which is shown as having an elongated bed or table carrying a horizontal feeding belt which extends lengthwise of the table and upon one end of which the beans are discharged in parallel relation extending transversely of the belt by a bean straightener. This feeding belt extends alongside the lower stretch of a chain of part molds which is moved in the same direction as the feeding belt. Operators standing alongside of the machine are thereby enabled to conveniently gather the proper quantities of beans from the feeding belt and place them in the part molds of the endless chain of part molds, these molds being filled to the degree necessary to provide the desired pack in the cans. These part molds extend inwardly from the chain toward one another and pass around a combined driving sprocket and molding wheel which is formed to provide a series of part molds, the part molds of this combined driving sprocket and molding wheel coacting with the part molds on the endless chain of part molds to compress the beans into cylindrical form. After being so compressed the beans are carried between a pair of rotary knives which sever the projecting ends of the beans and cut the molded beans to a length to exactly fill the cans. A can wheel and a rotary plunger carrying turret rotate with the combined driving sprocket and molding wheel, the can wheel being fed with empty cans and the plungers of the plunger carrying turret being actuated to transfer the molded cut beans from each mold into a corresponding can. Following this the filled cans are discharged from the can wheel. Provision is also made to prevent a can from being fed to the can wheel unless the corresponding pair of part molds contains a mass of beans, this preventing the cans from passing through the machine without being filled.

The working parts of the machine are carried by a bed or frame 30 suitably supported by standards 31, although it will be understood that any other form of supporting means could be employed. This frame supports an endless horizontal feeding belt 32 which extends lengthwise of the frame 30 and is arranged at one side thereof. For this purpose the feeding belt 32 is supported at one end by a driving pulley 35 which is fast, as best shown in Fig. 9, to a shaft 36 suitably journaled on the frame 30 and at its other end by a driven pulley 37 which is fast to a shaft 38, as best shown in Fig. 14. The upper stretch of the feeding belt 32 is supported by a horizontal shelf 39 which extends the full length of this upper stretch, this shelf having an upstanding flange 40 along one side, which flange is suitably secured to the bed 30 of the frame, and a downwardly projecting flange 41 along its opposite side which extends alongside both the upper and lower stretches of the feeding belt 32 so as to form a side guard for this belt. The upper stretch of the conveyer belt 32 rides along the upper surface of the shelf 39 and the frictional resistance to the movement of the belt is preferably reduced by metal strips 42 on the shelf. These strips can be provided in any desired arrangement as in a formation comprising a series of V's.

The drive pulley 35 for the feeding belt 32 is driven from an electric motor 50, shown in Fig. 2. The drive between the motor 50 and the drive shaft 36 for the feeding belt 32 comprises a chain 51 driven by the motor 50 and driving, as best shown in Fig. 4, a sprocket 52 on a counter shaft 53, this counter shaft 53 carrying a sprocket 54 connected by a chain 55 with a sprocket 56 on the shaft 36, as best shown in Fig. 9.

The driven pulley 37 of the feeding belt 32 forms a drive pulley for a bean straightener indicated generally at 60. As best shown in Figs. 13 and 14 the shaft 38 of this pulley is journaled in bearings provided in a bracket 61 mounted in a tilting frame 62 which can be tilted to different positions. This tilting frame is formed to provide a pair of horizontal laterally extending arms 63 which are pivotally secured by pivot bolts 64 to the ends of corresponding stationary arms 65 secured to the machine frame 30. The arms 63 and 65 extend transversely of the machine and the pivot bolts 64 extend horizontally at right angles to the shaft 38 and it will therefore be seen that the tilting frame 62 can be swung to different tilted positions about an axis parallel with the stretches of the conveyer belt 32. The selection of such tilted positions is permitted by a pair of bolts 70 extending through corresponding holes of a series 71 provided in each of the arms 63 and a series of holes 72 provided in each of the stationary arms 65. The several series of holes 71 and 72 are arranged concentric with the pivot bolts 64 so that the frame 62 can be held in the tilted position shown in Figs. 13 and 14 or can be set at a higher or lower inclination. This adjustment of the tilt or inclination of the frame 62 serves to adjust and control the operation of the bean straightener 60 mounted on this frame.

The purpose of this bean straightener is to gather the beans 75 into groups in parallel arrangement and deposit these groups on the upper stretch of the conveyer belt 32 so that the beans are in transverse arrangement on the upper stretch of this belt. As best shown in Fig. 13 the bean straightener 60 includes an arm 80 formed integrally with the bracket 61 and rising from the end of this bracket opposite from the end thereof on which the shaft 38 is supported. This arm is formed at its opposite end to provide a bearing 81 having a flange or collar 82 at its upper end, a shaft 83 being journaled in the bearing 81. This shaft extends transversely and obliquely upward and over the conveyer belt 32, the angularity of this shaft being determined by the adjustment of the bolt 70 in the holes 71 and 72 which determines the angularity of the tilting frame 62 on which the bean straightener supporting bracket 61 is mounted.

The arm 80 is shown as also carrying a stationary hopper 84, this stationary hopper comprising a circular base 85 secured to the upper flange or collar 82 of the bearing 81 by screws 86 or in any suitable manner and formed at its rim to provide a circular outwardly flaring base wall 87, the extreme upper part of which is disposed in a generally horizontal line. This base wall 87 is formed at its rim to provide a circular outwardly flaring wall 88, this side wall extending at approximately right angles to the base wall 87. This outwardly flaring side wall 88 is provided in its bottom with an elongated opening 89 through which the groups of beans 75 arranged in parallelism are deposited upon the upper stretch of the conveyer belt 32 which is arranged immediately under this opening 89. The shaft 83 carries a rotary hopper 90 which cooperates with the stationary hopper 84 to arrange the beans in parallelism and in groups, this rotary hopper including a central casting 91 having a hub 92 secured to the shaft 83, a circular base 93 arranged immediately above the base 85 of the stationary hopper 84 and a side wall 94 flaring outwardly from the rim of the base 93. This last outwardly flaring side wall 94 is arranged parallel with the corresponding outwardly flaring side wall 88 of the stationary hopper 84 and is spaced therefrom to provide an annular channel 95 which is open at its outer end but is closed at its inner end by the base wall 87 of the stationary hopper 84. Within this channel 95 the side wall 94 of the central casting is formed to provide a plurality of radially extending vanes 96, these vanes extending to the inner faces of the walls 87 and 88 of the stationary hopper 84 and dividing the channel 95 into a series of pockets 95a in which the beans 75 are received in groups in parallelism with one another and from which these groups are discharged through the opening 89 as these pockets are brought into register with this opening.

The upper end of the central casting 91 is closed by a circular sheet metal plate 100, the circular edge of which is held against the rim of the outwardly flaring side wall 94 by a screw 101 extending into the upper end of the shaft 83, and this central casting 91 also supports a sheet metal hopper having an outwardly flaring side wall 102 which is arranged to form a continuation of the outwardly flaring side wall 88 of the stationary hopper 84, a cylindrical wall 103 secured to the outer edges of this outwardly flaring side wall 102 and a rim 104 flaring inwardly from the outer edge of the cylindrical wall 103. This rim thereby forms an opening through which masses of string beans, in any arrangement, are dumped into the rotary hopper 90. Radial vanes 106 project inwardly from the walls 102 and 103 of the rotary hopper 90, these vanes alining with the vanes 96 of the central casting 91 and providing elongated pockets 95b alining with the channels 95a provided by the vanes 96.

The bean straightener is driven through power derived from the driven pulley 37 of the conveyer belt 32. For this purpose a sprocket 110 is fixed to the shaft 38 carrying this pulley, this sprocket being connected by a chain 111 with a sprocket 112 fast to a shaft 113 journaled in the inner end of the arm 80 which supports the bean straightener. This shaft 113 drives a beveled pinion 114 which in turn drives a beveled gear 115 fast to the angular shaft 83.

With the conveyer belt 32 in operation it will be seen that power is transmitted to the angular shaft 83 of the bean straightener to rotate the rotary hopper 90 of the bean straightener. Certain of the mass of beans in this rotary hopper fall into the pockets 95b between the vanes 106 of this rotary hopper in parallel relation to these vanes. Those beans which do not so fall into these pockets tumble back into the mass of beans in the rotary hopper as the pockets rotate to the upper part of the rotary hopper. As the pockets approach the top of the rotary hopper the flaring outer wall 102 increases in steepness, this wall being approximately horizontal at the bottom of the rotary hopper and approximately vertical at the top thereof. The parallel beans caught in the pockets 95b between the vanes 106 of the rotary hopper therefore slide endwise down the wall 102 as the vanes approach the top of the hopper and slide from the pockets 95b into the pockets 95a formed between the stationary and rotary hoppers 84 and 90. As these pockets 95a are brought into register with the opening 89, these beans are dropped in groups and in parallel arrangement onto the upper stretch of the conveyer belt 32 from which they are conveniently picked up by hand and placed in the part molds 116 on the lower stretch of an endless chain 117 of these part molds. It will therefore be seen that the upper stretch of the endless feeding belt 32 and the lower stretch of the endless chain 117 of part molds 116 traverse an elongated feeding station at which a large number of operators can gather the proper amounts of beans from the feeding belt 32 and deposit them in the individual part molds 116 passing along the lower stretch of the endless chain 117 of these molds. This endless chain 117 of part molds 116 is supported and driven as follows:

A housing 120 is supported at that end of the frame 30 supporting the bean straightener 60, this housing supporting a transverse shaft 123 which is carried by bearings adjustably secured to the housing 120. The shaft 123 carries an idler wheel 124 which, as best shown in Fig. 10, is fixed to the shaft 123 and is provided with a continuous beveled rim 125 which supports one end of the endless chain 117 of the part molds 116.

Each of the part molds 116 forming this chain, as best shown in Figs. 3 and 12, is shown as comprising an elongated semicylindrical body extending transversely of the line of movement of the chain of part molds, this body being formed at its advance side to provide a forwardly extending ear 131 and at its trailing side to provide a pair of rearwardly extending ears 132. In the endless chain these semicylindrical bodies 116 are arranged with their concave sides facing inwardly toward one another and with the forwardly projecting ear 131 of each mold body fitted between the pair of ears 132 of the next preceding body and these ears are shown as connected by horizontal pins 133 arranged parallel with the axes of the semicylindrical bodies. Each of these part mold bodies 116 is also formed to provide four upwardly projecting stacking fingers 135, a pair of these stacking fingers being arranged in spaced relation on the advance wall of each part mold body and a similar pair being arranged on the trailing wall of each part mold body. The spacing of these stacking fingers permits the rim 125 of the idler wheel 124 to engage the ears 131 on the advance side of the part mold bodies to support one end of the endless chain 117 of mold bodies as illustrated in Fig. 10.

Each of these fingers 135, in addition to being spaced from its companion finger, is also spaced a short distance inwardly from the corresponding end of the part mold body. The wall at the advance side of each part mold is formed in its ends projecting beyond these fingers to provide curved faces 136, the curvature of these faces being concentric with the pin 133 carrying the front end of the mold. The wall at the trailing side of each part mold is formed between the stacking fingers 135 and in its ends projecting beyond these fingers to provide curved faces 137, the curvature of these faces being concentric with the pin 133 carrying the trailing end of the mold. Each of the semicylindrical mold bodies 116 is also provided on its outer side, as best shown in Figs. 3, 5 and 12, with a pair of semicircular central rib 138 of substantial depth, each pair of these ribs being provided with a central pin 139 which extends parallel to the pins 133 and carries a roller 140 at each of its ends. While traversing the lower stretch of the endless chain 117 of the part molds 116, these rollers ride, as best shown in Fig. 10, upon the back of a channel 145 which forms a part of the frame 30 of the machine and which supports the lower stretch of the endless chain of part molds to pass in a horizontal plane and parallel with the upper stretch of the feeding belt 32 which is arranged immediately alongside the lower stretch of the endless chain of part molds. The lower stretch of this chain of part molds and the upper stretch of the feeding belt 32 move in the direction of the arrow shown in Fig. 2. It will therefore be seen that operators standing alongside of the machine can readily gather an amount of the groups of parallel beans from the feeding belt 32 and place this amount of beans in the part molds 116.

As best shown in Figs. 4 and 5 the end of the chain 117 of part molds 116 opposite the bean straightener 60 passes around the periphery of a combined driving sprocket and molding wheel indicated generally at 150 which traverses a transferring station at which the contents of the part molds 116 are compressed into cylindrical forms by cooperation with the combined driving sprocket and molding wheel and are pushed into empty cans in a manner hereinafter described.

This combined driving sprocket and molding wheel is shown as secured in any suitable manner to the central flange 151 of a sleeve 152, one end flange of this sleeve 152 being secured, as indicated at 153, to a plunger carrying turret 154 which is fast to a drive shaft 155. This shaft is journaled in bearings provided in a stationary end head 156 and in a can wheel housing 157 mounted at the discharge end of the machine. This shaft is driven by the electric motor 50 through the counter shaft 53 which, for this purpose, carries a pinion 158 driving a gear 159 loosely mounted on the drive shaft 155. The gear 159 is operatively connected to the drive shaft 155 through a jaw clutch 160 operated by a hand lever 161.

The part molds 116 on the lower stretch of the endless chain of these molds are delivered to the combined driving sprocket and molding wheel 150 in proper position by a rail 162 leading, as best shown in Figs. 3 and 9, from the end of the horizontal channel 145 supporting the rollers 140 of the part molds 116. These rollers follow along the rail 162 which leads the part molds into proper interengagement with the molding fingers carried by the combined driving sprocket and molding wheel 150.

This combined driving sprocket and molding wheel 150, as best shown in Figs. 4, 5 and 11, comprises a rim 165 suitably secured to the central flange 151 of the sleeve 152. At intervals corresponding to the spacing of the part molds 116 along the chain 117, this rim 165 is formed to provide transverse ribs 166. At its center each of these ribs 166 is formed to provide a pair of outwardly projecting fingers 167, 168 which, as best shown in Figs. 5 and 11, are adapted to fit between or interlace with the corresponding stacking fingers 135 of one of the part molds 116 and mold the beans 75 therein into cylindrical form. For this purpose the fingers 167 jointly form a semicylindrical molding face 169.

The fingers 167 and 168 are preferably not of identical form, the finger 167 being the advance finger on entering between the stacking fingers of the part molds and being shown as extending up to the centerline between the part molds and the combined driving sprocket and molding wheel and being pointed and the finger 168 being the trailing finger entering between the stacking fingers of the part molds and being shown as curved to conform with and engage the curved face 137 between the pair of stacking fingers 135 at the trailing side of each part mold 116. It will be seen that as the rail 162 leads the part molds 116 successively into register with each pair of molding fingers 167 and 168 of the combined driving sprocket and molding wheel 150, each pair of molding fingers 167, 168 enters between the stacking fingers 135 of the corresponding part mold 116 to complete the cylindrical mold for the beans.

To support and drive the chain 117 of part molds 116 and also to assist the center fingers 167, 168 of the rim 165 in molding the beans into cylindrical form, the rim 165 is channeled at its opposite edges to receive a pair of side rings 170. These side rings, as shown in Figs. 4, 5 and 11, can be secured to the rim 165 in any suitable manner as by screws 171 which screw into the ribs 166 of the rim. Each of these side rings 170 is formed to provide a plurality of spaced, radially extending arms 175 forming semicircular pockets 176 which coincide with the semicylindrical molding faces 169 of the central fingers 167, 168 of the combined driving sprocket and molding wheel and hence coact with the part molds 116 to mold the ends of the beans into cylindrical form as these part molds traverse the combined driving sprocket and molding wheel. The extremity of each of these arms 175 is also curved on its advance side, as indicated at 177, to engage the corresponding curved end face 137 on the trailing part of each part mold 116 thereby to support and drive the chain of molds around the combined driving sprocket and molding wheel. Similarly the extremity of each of the arms 175 is curved on its trailing side, as indicated at 178, to engage the corresponding curved end face 136 on the advance part of each part mold 116.

After the beans have been pressed into cylindrical form by the coaction of the part molds 116 with the molding pockets in the combined driving sprocket and molding wheel 150, they are passed between two rotary knives 180, 181 which sever the ends of the molded beans and form them into a right cylinder. As best shown in Figs. 4 and 5, these rotary knives are fast to a shaft 182 arranged directly under and parallel with the shaft 155 on which the combined driving sprocket and molding wheel is mounted. The upper parts of these knives are arranged immediately adjacent the opposite sides of the lower part of the combined driving sprocket and molding wheel 150 and are rotated at a high rate of speed through drive belts 183 which pass around a pulley 184 on the shaft 182 and a drive pulley 185 on the shaft of the electric motor 50, as shown in Fig. 2.

Since the beans are pressed into cylindrical form on traversing the lowermost part of the combined driving sprocket and molding wheel 150, the projecting irregular ends of the beans are cleanly severed as they traverse the spaced rotary knives 180, 181 and the molded beans are brought to a right cylindrical form to fit the cans. The severed ends preferably fall into a stationary discharge spout 186 the upper part of which serves as a housing for the rotary knives.

The cans 190 are supplied from an overhead vertical canway 191 which can be of any suitable construction and which permits the cans to drop into the pockets 192 of a can feeding wheel 193, the cans being maintained with their axes parallel with the drive shaft 155 throughout their course through the machine. This can feeding wheel is fast to a shaft 194 which is journaled in the housing 195 for this can feeding wheel. The cans dropping into the pockets 192 are delivered to the pockets 196 of a main can wheel, indicated generally at 197 in the can wheel housing 157. To properly position the cans in the main can wheel 197, these cans are preferably fed against an arcuate cam 198 secured to the can wheelhousing and serving to shift each can to its proper axial position relative to the can wheel. As this positioning varies with the different sizes of cans handled, the cams 198 are preferably provided in different sizes and each is carried by a removable bracket 199.

The can wheel 197 is fast to the shaft 155 and is shown, as best illustrated in Fig. 4, as comprising a hub 200 mounted on an axial extension 201 of the sleeve 152 which rotates with the shaft 155. The can wheel is shown as comprising two spaced disks 202 and 203 formed integrally with the hub 200 and each formed at its periphery to provide the can pockets 196. These pockets 196 of each disk aline with one another so that each can 190 is supported at its opposite ends in the pockets of both of the disks 202 and 203. These pockets 196 are also arranged to aline with the pockets formed in the combined driving sprocket and molding wheel 150 by the central fingers 167 and 168 and the arms 175 of the side plates 170 of this combined driving sprocket and molding wheel 150. For this purpose a plurality of adjusting screws 205 extend through the hub 200 of the main can wheel and screw into an outwardly extending flange 206 formed integrally with the sleeve 152. These screws extend through arcuate slots 207 in the hub 200 of the can wheel and it will therefore be seen that the can wheel can be set to have its pockets 196 accurately alined with the pockets of the combined driving sprocket and molding wheel 150 before the screws 205 are tightened. The heads of the screws 205 preferably are arranged within the main can wheel 197 and access to these screws for the purpose of adjusting the main can wheel is provided through openings 208 in the outer disk 202 of this main can wheel.

The can feeding wheel 193 and the main can wheel 197 are rotated in the direction of the arrows shown in Fig. 5 and it will therefore be seen that the empty cans are fed to the pockets 196 of the main can wheel 197 at a point in approximate horizontal alinement with its drive shaft 155 and the cans are carried upwardly by the main can wheel 197 during which movement of the cans they are filled with the molded and cut beans contained in the molding cavities of the combined driving sprocket and molding wheel 150, as hereinafter described.

The filled cans are discharged from the main can wheel 197 by an inclined arm 210 which is secured, as indicated at 211, Fig. 5, to the can wheel housing 157 immediately under a can discharge opening 212 in this housing. This arm 210 extends upwardly from its place of anchorage to the can wheel housing 157 between the two disks 202 and 203 of the can wheel and hence the filled cans are withdrawn from the pockets 196 of the can wheel by this arm as the cans pass beyond the top of the can wheel. The cans so withdrawn roll, by gravity, down the arm 210 and out through the discharge opening 212 in the can wheel housing. In passing through this opening the cans are caught between the rods 215 of a can discharge chute 216 which can be of any suitable form to deliver the cans in any position desired for the subsequent processing of the filled cans.

As the cans in the can wheel pockets 196 travel from the place of feeding of these cans by the can feeding wheel 193 to the main can wheel 197 to the top of this can wheel, the molded beans compressed in the pockets of the combined driving sprocket and molding wheel 150 are transferred into the cans. For this purpose the plunger carrying turret 154 which rotates with the combined driving sprocket and molding wheel 150 and the main can wheel 197, carries a plurality of plungers 220, these plungers alining with the pockets 196 of the main can wheel and hence also with the pockets of the combined driving sprocket and molding wheel 150. Each of these plungers 220 is provided adjacent the combined driving sprocket and molding wheel 150 with a head 221 which is slightly smaller than the cavity formed by the pockets in the combined driving sprocket and molding wheel 150 and the part molds 116 being conveyed around this combined driving sprocket and molding wheel 150 so that it can enter these mold cavities and push the contents of the molds into the cans.

To effect this movement of the plungers, a stationary cylindrical drum 225 is mounted inside of the housing 226 for the turret 154 and this drum is formed to provide an inwardly facing cam groove 227. As best shown in Fig. 4 this cam groove includes a straight portion or land which extends around one-half of the drum 225 from its top to its bottom, a salient portion 228 leading to a land 229; and a salient portion 230 extending outwardly from the land 229 and returning to the main straight portion or land of the cam groove. A sleeve 235 is fixedly secured to each of the plungers 220 and each sleeve carries a roller 236 which rides in the cam groove 227. It will therefore be seen that as the turret 154 is rotated, the plungers 220 are reciprocated by the cam groove and are projected into and retracted from the cavities jointly provided by the combined driving sprocket and molding wheel 150 and the chain of part molds 116 being conveyed around this combined driving sprocket and molding wheel so as to transfer the contents of these cavities into the cans 190.

With the shape of the cam groove 227, as shown, each plunger is held in a retracted position as it descends from the top to the bottom of the turret 154 since at this time its roller is traversing the straight portion or main land of the cam groove. Following the start of the upward movement of each plunger, its roller 236 enters the salient portion 228 of the cam groove and the plunger is extended axially to enter the corresponding cavity jointly provided by the combined driving sprocket and molding wheel 150 and the chain of part molds 116 being conveyed around this combined driving sprocket and molding wheel. Following this entry the plunger is held in an arrested position by the land 229 of the cam groove, this continuing until the plunger reaches a position approximately in horizontal alinement with the axis of the plunger carrying turret 154. After the plunger reaches this position its roller enters the salient portion 230 of the cam groove and hence the plunger is extended fully into the corresponding mold cavity and later retracted therefrom.

Means are provided whereby if the operators have failed to fill one of the part molds 116 with beans a can is not fed to the corresponding pocket 196 of the main can wheel 197 by the can feeding wheel 193. For this purpose a pin carrying wheel 240 is secured to the end of the shaft 155 which projects outwardly from the can wheel housing 157 so that this pin carrying wheel is arranged outside of the can wheel housing. This pin carrying wheel is preferably adjustably secured to the shaft 155 and for this purpose it is shown as adjustably mounted on a hub 241 keyed to the shaft 155 by screws 242 which extend through arcuate slots 243 in the pin carrying wheel. It will be apparent that upon loosening the screws 242, the pin wheel can be rotated relative to the shaft 155 to any desired position within the limits provided by the slots 243 and that hence the relation of this pin carrying wheel to the main can wheel 197 can be adjusted.

A plurality of pins 245 are spaced around the rim of this pin carrying wheel, these pins being each arranged in a slideway 246 extending parallel with the axis of the pin carrying wheel 240 and these slideways being equidistant from the axis of the pin carrying wheel. These pins are loosely arranged in the slideways 246 and are movable to project either outwardly from the front face 247 of the pin carrying wheel 240 or inwardly from the rear face 248 thereof. The number and spacing of the pins 245 corresponds to the number and spacing of the pockets 196 in the main can wheel 197.

As the pin carrying wheel rotates each of the pins 245 is pushed inwardly to project from the rear face 248 of the pin carrying wheel by a stationary cam indicated generally at 249. This stationary cam can be of any suitable form and, as best shown in Fig. 6, is shown as comprising an arm 250 secured to the can wheel housing 157 and projecting beyond the rim of the pin carrying wheel 240 in about the 7:30 o'clock position, as viewed in Fig. 3. This arm carries a lateral extension 251 at its outer end, this extension being formed to provide a cam face 252 which is arranged in the path of the outer ends of the pins 245 being carried around by the pin carrying wheel 240 so that as these pins pass the cam face 252 they are each moved to project inwardly from the rear face 248 of the pin carrying wheel 240.

These pins are subsequently returned to the position in which they project outwardly from the front face 247 of the pin carrying wheel only when the corresponding cavity formed by the combined driving sprocket and molding wheel 150 and the chain of part molds 116 is filled with beans. For this purpose a square rod 255, as best shown in Figs. 5–8, is mounted in slideways 256 provided in ears projecting downwardly from the housing 195 for the can feeding wheel, this sliding rod 255 being arranged parallel with the axis of the pin carrying wheel 240 and being arranged in about the 8 o'clock position, as viewed in Fig. 3. At its inner end a plate 257 is arranged, this plate projecting radially toward the axis of the main shaft 155. This plate is located between the combined driving sprocket and molding wheel 150 and the main can wheel 197 and is arranged in position to be engaged by the advance ends of the molded masses of beans when these beans are pushed forwardly by the initial movement of the plungers 220 in riding up the initial salient portion 228 of the cam groove 227.

The other or outer end of the sliding square rod 255 carries a shoe 258 which is adapted to be moved into the path of the ends of the pins 245 which project inwardly from the inner face 248 of the pin carrying wheel 240. To prevent the pins from jamming against the advance edge of this shoe, this advance edge is preferably bent to provide an inclined portion 259 as shown in Figs. 6–8. Further, the shoe 258 is so arranged that the pins 245 simultaneously engage both this shoe and also the cam face 252, as best shown in Fig. 8. It will therefore be seen that the inward movement of the pins 245 through engagement with the stationary cam face 252 serves to initially shift the shoe 258 to the left, as viewed in Figs. 6–8, thereby similarly shifting both the square rod 255 and the plate 257 at its opposite end.

It will be seen that with this arrangement the pins are each pressed inwardly upon engaging the stationary cam face 252 and that this movement of each pin serves to displace the plate 258, square rod 255 and plate 257 inwardly or to the left as viewed in Figs. 6–8. If the corresponding cavity formed by the combined drive sprocket and molding wheel 150 and the chain of part molds 116 is filled with beans, the initial movement of the corresponding plunger 220 by the salient part 228 of the cam groove 227 will operate to displace this mass of beans to the left as viewed in Fig. 4 and to the right as viewed in Figs. 6–8. This movement causes the leading ends of this mass of beans to engage the plate 257 which displaces this plate, the square rod 255 and the shoe 258 to the right as viewed in Figs. 6–8. Since this shoe 258 at this time is in engagement with the pin 245 corresponding to the cavity containing the mass of beans so displaced, this pin will be displaced to project outwardly from the front face 247 of the pin carrying wheel 240. This pin so projecting outwardly from the front end 247 of the pin carrying wheel 240 is carried, by the rotation of the pin carrying wheel, into engagement with one of the arm 260 of a star wheel 261, as best shown in Fig. 3. This star wheel is fast to the front end of the shaft 194 carrying the can feeding wheel 193. The can feeding wheel 193 is shown as having four can receiving pockets 192 and the star wheel 261 likewise has four arms 260 so that as each pin 245 engages and moves the star wheel a quarter turn one can is fed into the corresponding pocket of the main can wheel 197.

In order to provide smooth and noiseless operation of the star wheel 261 by the succession of projecting pins 245 carried by the pin carrying wheel 240, the side of each arm 260 which is struck by the pins is preferably indented and of rounding form, as indicated at 263, the pins riding around these curved indentations 263 in moving the star wheel a quarter turn. Similarly, to prevent the star wheel and can feeding wheel from overriding and to support the weight of the column of cans in the canway 191 on the can feeding wheel 193, the hub 264 of the star wheel 261 is provided with four grooves 265 which receive a spring loaded detent pin 266. This detent can be of any suitable construction and, as best shown in Fig. 7, is shown as mounted in a bracket 267 secured to the housing 195 of the can feeding wheel and as having a bore containing a helical compression spring 268 which urges the detent pin 266 downwardly. The force of the helical compression pin 268 is shown as being adjustable by means of a screw screwed into the upper end of the bore of the bracket 267. The detent grooves 265 are so positioned that they are engaged by the detent pin 266 immediately following the release of each of the arms 260 of the star wheel by each pin 256. The detent pin 266 thereby serves to immediately stop the star wheel following this release and it will also be seen that this detent pin assists in supporting the weight of the cans 190 on the can feeding wheel 193, as shown in Fig. 5.

The supper stretch of the endless chain 117 of part molds 116 is preferably supported by its rollers 140 by a covered track. As best shown in Fig. 9 this track comprises two spaced side angles 270 the upper flanges of which support the rollers 140 of the endless chain of part molds 116 and the side flanges of which project downwardly to house the inverted part molds 116 suspended from these rollers. The top of the track is shown as housed by a metal cover 271. The track can be supported in any suitable manner at one end by the housings 157 and 226 for the can wheel and the turret and at its opposite end by the housing 120 for the idler wheel 124.

*Operation*

In the operation of the machine the motor 50 is driving the horizontal endless feeding belt 32 so that its upper stretch travels in the direction of the arrow shown in Fig. 1. This drive, as best shown in Fig. 4, is effected through the chain 51 driven by the electric motor, sprocket 52, counter shaft 53, sprocket 54, chain 55, sprocket 56 (Fig. 9), shaft 36 and drive pulley 35 for the endless feeding belt 32. The opposite end of this endless feeding belt 32 passes around and drives the pulley 37 (Fig. 14) and the upper stretch of this endless feeding belt 32 is supported to move in a horizontal plane by the stationary shelf 39 (Fig. 13).

This pulley 37 is fast to its shaft 38 which, as best shown in Fig. 14, carries the sprocket 110 driving the chain 111 which in turn drives the sprocket 112, as shown in Fig. 13, counter shaft 113, beveled pinion 114 and beveled gear 115 fast to the shaft 83 of the bean straightener 60. This shaft rotates the rotary hopper 90 of this bean straightener into which hopper the beans are dumped in any order.

As the rotary hopper 90 rotates certain of the mass of beans in this rotary hopper fall into the pockets 95b between the vanes 106 of this rotary hopper in parallel relation to these vanes. Those beans which do not so fall into these pockets tumble back into the mass of beans in the rotary hopper as the pockets rotate to the upper part of the rotary hopper. As the pockets approach the top of the rotary hopper the flaring outer wall 102 thereof increases in steepness, this wall being approximately horizontal at the bottom of the rotary hopper and approximately vertical at the top thereof. The parallel beans caught in the pockets 95b between the vanes 106 of the rotary hopper thereby slide endwise down the wall 102 as the vanes approach the top of the rotary hopper and slide from the pockets 95b into the channels 95a formed between the stationary hopper 84 and the rotary hopper 90. As these channels 95a are brought into register with the opening 89 in the stationary hopper 84, these beans are dropped in groups and in parallel arrangement onto the upper stretch of the feeding belt 32 from which they are conveniently gathered by the operators and placed in the part molds 116 of the endless chain 117 of these part molds.

When it is necessary to change the inclination of the bean straightener 60 to obtain the desired rate of discharge of positioned beans on the belt 32 in accordance with the number of operators transferring beans from the feeding belt 32 to the molds, this is readily effected by removing the bolts 70 (Figs. 13–15), adjust the bean straightener to the desired angle about the axis of the pivot bolts 64 which support the tilting frame 62 on which the bean straightener is mounted, and replace the bolts 70 in the holes of the series 71 and 72 which aline in this newly selected position of the bean straightener.

One end of the endless chain of part molds 116 is supported and driven by a combined driving sprocket and molding wheel 150 (Figs. 4 and 5) arranged at the discharge end of the machine. This combined driving sprocket and molding wheel 150 is driven from the electric motor 50 through a pinion 158 on the counter shaft 53 and a gear 159 and clutch 160 on the main shaft 155 as best shown in Fig. 4. To this shaft is fixed the rotary turret 154 to which is secured the sleeve 152 carrying the combined driving sprocket and molding wheel 150.

The endless chain 117 of part molds comprises a series of part molds which are connected by the pins 133 and each of which is provided with the rollers 140 which are supported on the track 145, as best shown in Fig. 10, when the chain is traversing its lower stretch or feeding station, this track being arranged immediately adjacent the upper stretch of the feeding conveyer belt 32. Each of these part molds is also provided with upright stacking fingers 135 which permits of loosely packing the quantity of beans subsequently compressed into the mold and these part molds are also provided at the bases of these fingers with curving surfaces 136, 137 which form the driving surfaces which engage the driving fingers provided on the combined driving sprocket and molding wheel 150, the part molds being led to interengage with these driving fingers by the stationary rail 162 at the discharge end of the track 145, as best shown in Fig. 5. The combined driving sprocket and molding wheel 150 is provided with central molding fingers 167, 168 and also with side plates 170 having radial arms 175, these fingers and the arms of these side plates forming a series of half round molding pockets in the combined driving sprocket and molding wheel. The extremities of the arms 175 of the side plates 170 are curved to engage with the curved driving faces 136 and 137 of each part mold 116, thereby to support the chain of part molds and drive this chain of part molds around the combined driving sprocket and molding wheel.

The opposite end of the chain of part molds, as best shown in Fig. 10, is supported by an idler wheel 124 having a continuous beveled rim which supports the ears 131 on the advance sides of the part mold bodies.

As the filled part molds 116 are brought into engagement with the combined driving sprocket and molding wheel 150 the beans contained in the part molds 116 are compressed into cylindrical form by the fingers 167, 168 and arms 175 of the combined driving sprocket and molding wheel. After being so compressed into cylindrical form the beans are moved past the pair of rotary knives 180 and 181, these knives severing the ends of the molded mass of beans so as to bring them to a right cylindrical form. These knives, as best shown in Fig. 4, are mounted on the shaft 182 having the pulley 184 which is connected by the belts 183 with a pulley 185 on the drive shaft of the motor, as best shown in Fig. 2.

Following the cutting of the ends of the molded beans the rotation of the rotary turret 154 causes the roller 236 (Fig. 4) of the corresponding plunger 220 to enter the salient portion 228 of the cam groove whereby this plunger is moved to the left as viewed in Fig. 4 and into engagement with the molded beans contained in the corresponding cavity formed jointly by the combined driving sprocket and molding wheel 150 and the endless chain of part molds 116. This initial movement of the plunger displaces the molded mass of beans into engagement with the plate 257 and shoves this plate to the right, as viewed in Figs. 6–8. This movement of the plate 257, through its connection with the sliding square rod 225, moves the shoe 258 to the right and thereby moves the corresponding pin 245 to project outwardly from the front face 247 of the pin carrying wheel 240. This pin carrying wheel, as best shown in Fig. 4, is adjustably mounted on the main shaft 155 which also carries the combined driving sprocket and molding wheel 150 and as this displaced pin is carried upwardly by the rotation of the pin carrying wheel, it engages one arm 260 of the star wheel 261, as best shown in Fig. 3, and turns this star wheel a quarter turn. This star wheel is fast to the shaft 194 which drives the can feeding wheel 193, as best shown in Fig. 5.

The pockets 192 of this can feeding wheel are kept filled with the cans 190 from the vertical canway 191 and the movement of the star wheel 261 thereby serves to feed a can into the corresponding pocket 196 of the main can wheel 197. The proper axial positioning of the cans in the main can wheel 197 is secured by the arcuate cam 198, shown in Fig. 4, this cam being removable with its supporting bracket 199 so that cams 198 of different sizes can be substituted for cans of different lengths handled by the machine. This main can wheel 197 also rotates with the main shaft 155 and hence rotates in unison with the combined driving sprocket and holding wheel 150 and the plunger carrying turret 154.

The continued rotation of this plunger carrying turret 154 causes the roller 236 of the corresponding plunger 220 to enter the salient portion 230 of the cam groove 227, this salient portion of the cam groove causing this plunger to be projected completely into the corresponding cavity jointly formed by the combined driving sprocket and molding wheel 150 and the endless chain of part molds 116. This movement of the plunger thereby transfers the molded beans contained in this cavity into the empty can just fed into the corresponding pocket 196 of the main can wheel.

The filled can is carried to the top of the can wheel 197 where it is caught by and rolls down the inclined arm 210, as best shown in Fig. 5, and out through the discharge opening 212 of the can wheel housing 157 and into the discharge chute 216.

The upper stretch of the endless chain 117 of part molds 116 is supported by the covered track 270, as best shown in Fig. 9, the rollers 145 of the part molds riding along this track and the part molds 116 being carried back to the idler wheel 124 in an inverted position.

To return the plate 257 and the shoe 258 to the initial position, that is, to the left as viewed in Figs. 6–8, the pins 245 projecting outwardly from the outer face 247 of the pin carrying wheel 240 engages the stationary cam face 252 which forces these pins inwardly and into engagement with the shoe 258 so as to move this shoe to the left, as viewed in Figs. 6–8 and also to cause the pins to project inwardly from the inner face 248 of the pin carrying wheel 240. This stationary camface 252 thereby returns each pin 245 to the initial position assumed and also returns the shoe 258, sliding bar 255 and plate 257 to the initial position assumed for the feeding of a can to receive the molded beans from the corresponding molding cavity.

In the event that one of these cavities does not contain beans through the failure of the operator to fill all of the part molds 116 along the lower stretch of the chain 117 of these part molds, the corresponding plunger 220, during its initial axial movement effected by the salient part 228 of the cam groove 227 (Fig. 4) does not encounter any beans and hence does not displace these beans so as to shove the plate 257 to the right as viewed in Figs. 6–8. Under these conditions the square rod 255 and shoe 258 are also not moved to the right and hence this shoe is not moved to project the corresponding pin 245 from the front face 247 of the pin carrying wheel 240. Since this pin is not projected from the front face of this pin carrying wheel it does not, of course, engage the corresponding arm 260 of the star wheel 261 and hence this star wheel is not rotated a quarter turn when the empty cavity passes. Consequently the can feeding wheel 193 is not rotated to feed an empty can to the can wheel pocket 196 opposite this empty cavity. It will therefore be seen that when an empty cavity occurs no can is fed to the can wheel pocket opposite this empty cavity and hence unfilled cans are not discharged from the machine.

In order to prevent the star wheel and the can wheel from overrunning and also to assist the can feeding wheel 193 in supporting the weight of the column of empty cans supported in the vertical canway, the spring loaded pin 266 is provided, as shown in Fig. 7, which engages with detent grooves 265 provided at the hub of the star wheel 261.

From the foregoing it will be seen that the present invention provides a machine which receives elongated foodstuffs, such as string beans in bulk; arranges them in parallel order on a feeding belt from which they are readily gathered and placed in the part molds of an endless conveyer by a number of operators; molds the beans so placed in the molds into cylindrical form by passing the part mold conveyer around a combined driving sprocket and molding wheel; trims the beans so molded into the form of a right cylinder; feeds an empty can into position to receive the beans from the filled molds and selectively prevents an empty can from being fed opposite an unfilled mold; transfers the molded beans into the empty cans; and discharges the filled cans from the machine. The apparatus is also comparatively compact and simple, considering the functions it performs and is entirely positive and reliable in its operation and will stand up under conditions of severe and constant use without getting out of order or requiring repairs.

I claim as my invention:

1. Apparatus for packing foodstuffs, comprising an endless flexible conveyer, means for supporting said conveyer to traverse a non-circular path, means for moving said conveyer to successively traverse a filling station and a transferring station, a plurality of molds carried by said conveyer in spaced relation and projecting inwardly from said conveyer into the space between the stretches of said conveyer and defined by said conveyer, said molds being adapted to be filled with said foodstuffs at said filling station, and means for emptying said molds into cans at said transferring station.

2. Apparatus for packing foodstuffs, comprising an endless flexible conveyer, means for supporting said conveyer to provide upper and lower horizontal stretches, means for continuously moving said conveyer to successively traverse a filling station along said lower stretch and a transferring station, a series of part molds carried by said conveyer and projecting inwardly from said conveyer into the space between the stretches of said conveyer and defined by said conveyer, said part molds being adapted to be filled with said foodstuffs at said filling station, means adjacent said transferring station for compressing said foodstuffs into said molds and means for emptying said molds into cans at said transferring station.

3. Apparatus for packing foodstuffs, comprising an endless flexible conveyer having upper and lower horizontal stretches, a series of part molds carried by said conveyer and projecting inwardly from said conveyer into the space between the stretches of said conveyer and defined by said conveyer, said part molds being adapted to be filled with said foodstuffs while traversing said lower stretch, a molding wheel around which said endless conveyer passes and having a series of radially outward projecting part molds adapted to progressively cooperate with the part molds on said conveyer and compress the contents thereof, means for moving said molding wheel and endless conveyer to successively bring the part molds on said lower stretch of said endless conveyer into cooperative relation with the part molds on said molding wheel and means for transferring into cans the foodstuffs compressed between the part molds of said molding wheel and conveyer.

4. Apparatus for packing foodstuffs, comprising an endless flexible conveyer having upper and lower stretches, a series of part molds carried by said conveyer and projecting inwardly from said conveyer into the space between the stretches of said conveyer and defined by said conveyer, said part molds being adapted to be filled with said foodstuffs while traversing said lower stretch of said conveyer, a combined driving sprocket and molding wheel embraced by said flexible endless conveyer and having a series of outwardly projecting fingers adapted to successively engage each of said part molds and drive said endless conveyer, means for continuously rotating said combined driving sprocket and molding wheel to successively bring the filled part molds on the lower stretch of said endless conveyer into engagement with its said fingers to compress the foodstuffs in said part molds, and means for transferring into cans the foodstuffs so compressed between said combined driving sprocket and molding wheel and the part molds of said endless flexible conveyer.

5. Apparatus for packing foodstuffs, comprising an endless flexible conveyer having upper and lower stretches, a series of part molds carried by said conveyer and projecting inwardly from said conveyer into the space between the stretches of said conveyer and defined by said conveyer, said part molds being adapted to be filled with said foodstuffs while traversing said lower stretch of said conveyer, a combined driving sprocket and molding wheel supporting one part of said flexible endless conveyer and having a series of outwardly projecting molding fingers having curved end faces adapted to successively engage corresponding curved faces provided on each of said part molds and drive said endless conveyer, means for continuously rotating said combined driving sprocket and molding wheel to successively bring the filled part molds on the lower stretch of said endless conveyer into engagement with its molding fingers, the foodstuffs in said filled part molds being compressed into the desired form by said molding fingers, and means for transferring axially into cans the foodstuffs so compressed between said molding fingers and said part molds.

6. Apparatus for packing foodstuffs, comprising an endless flexible conveyer having upper and lower stretches, a series of part molds carried by said conveyer and projecting inwardly from said conveyer into the space between the stretches of said conveyer and defined by said conveyer, each of said part molds comprising an open molding cavity open at its opposite ends and stacking fingers extending laterally from the leading and trailing sides of said molding cavity, said part molds being thereby adapted to be filled with said foodstuffs while traversing said lower stretch of said conveyer, a combined driving sprocket and molding wheel supporting one part of said flexible endless conveyer and having a series of outwardly projecting molding fingers adapted to interlace with said stacking fingers and having curved end faces adapted to successively engage corresponding curved faces provided on said part molds at the bases of said stacking fingers and drive said endless conveyer, means for continuously rotating said combined driving sprocket and molding wheel to successively bring the filled part molds on the lower stretch of said endless conveyer into engagement with its molding fingers, the foodstuffs in said filled part molds being compressed into the desired form by said molding fingers, and means for transferring axially into cans the foodstuffs so compressed between said molding fingers and said part molds.

7. Apparatus for packing foodstuffs, comprising a series of one piece part molds each having central ears on its advance and trailing sides, an open mold cavity and a pair of stacking fingers projecting laterally from the advance and trailing sides of said part mold and from opposite sides of said ears and forming a lateral extension of said mold cavity, a plurality of pins connecting the ears of said part molds to provide an endless chain of part molds having their cavities and stacking fingers projecting inwardly from said conveyer into the space between the stretches of said conveyer and defined by said conveyer, said part molds being adapted to be filled with said foodstuffs while traversing a lower stretch of said chain of molds, an idler wheel supporting one part of said endless chain of molds and comprising a wheel rotatable about a horizontal axis and having a continuous rim adapted to be embraced by said stacking fingers and to engage and support said ears of said endless chain of molds, a combined driving sprocket and molding wheel supporting the other part of said endless chain of molds and having a series of outwardly projecting molding fingers adapted to interlace with said stacking fingers and having curved end faces adapted to successively engage corresponding curved faces provided on said part molds at the bases of said stacking fingers and drive said endless chain of molds, means for continuously rotating said combined driving sprocket and molding wheel to successively bring the filled part molds on the lower stretch of said chain of molds into engagement with its molding fingers, the foodstuffs in said filled part molds being compressed into the desired form by said molding fingers, and means for transferring into cans the foodstuffs so compressed between said molding fingers and said part molds.

8. Apparatus for packing foodstuffs, comprising a frame, an idler wheel journaled on one end of said frame to rotate about a horizontal transverse axis, a combined driving sprocket and molding wheel journaled on the opposite end of said frame to rotate about a horizontal transverse axis, a flexible chain of open part molds passing around and supported by said idler wheel and said combined driving sprocket and molding wheel and having upper and lower stretches extending therebetween, the cavities of said part molds facing inwardly from said conveyer into the space between the stretches of said conveyer and defined by said conveyer, rollers provided on the opposite outer sides of each of said part molds, a plurality of molding fingers projecting radially outward from said combined driving sprocket and molding wheel and having their ends formed to engage and drive correspondingly shaped faces provided on each of said part molds to propel said endless chain of molds, said molding fingers being formed to compress foodstuffs placed in said part molds while traversing said lower stretch of said chain of part molds into the desired form, means for continuously rotating said combined driving sprocket and molding wheel to bring the part molds of the lower stretch of said chain of part molds successively into engagement with its molding fingers, means for transferring the foodstuffs so compressed between said molding fingers and said part molds and a track supported on said frame and engaging and supporting said rollers of said part molds while traversing said lower stretch of said chain of part molds and leading said part molds into proper engagement with the molding fingers of said combined driving sprocket and molding wheel.

9. Apparatus for packing foodstuffs, comprising a frame, a pair of horizontally spaced wheels mounted on said frame to rotate about horizontal axes, a flexible endless conveyer passing around the peripheries of said wheels, a plurality of open molds mounted on said conveyer in spaced relation and projecting inwardly therefrom from said conveyer into the space between the stretches of said conveyer and defined by said conveyer, said molds being adapted to be filled with foodstuffs while traversing the lower horizontal stretch of said conveyer, means on the periphery of one of said wheels and adapted to successively engage said molds to drive said conveyer and compress the foodstuffs of the filled molds into the desired form, means for rotating said one of said wheels to successively bring the molds of the lower stretch of said conveyer into engagement therewith, a shaft arranged under said one of said wheels parallel with the axis thereof, a pair of spaced rotary knives fast to said shaft and arranged on opposite sides of the passing molds to trim the ends of the foodstuffs projecting from the passing molds, means for rotating said shaft and means for transferring into cans the foodstuffs compressed between said molds and said one of said wheels following said trimming thereof.

10. Apparatus for packing foodstuffs, comprising an endless flexible conveyer, means for supporting said conveyer to traverse a non-circular path, means for moving said conveyer to successively traverse a filling station and a transferring station, a plurality of open ended molds mounted on said conveyer in spaced relation within the axes of said molds in substantially parallel relation and at right angles to the line of movement of said conveyer, said molds being adapted to be filled with said foodstuffs at said filling station, means synchronized with the movement of said conveyer for conveying empty cans alongside said conveyer at said transferring station in position to receive the contents of said molds, means synchronized with the movement of said conveyer for emptying said molds into said cans at said transferring station and means responsive to the presence of foodstuffs in each mold for feeding a corresponding can to said empty can conveying means whereby cans are prevented from passing through the machine without being filled.

11. Apparatus for packing foodstuffs, comprising a conveyer, means for moving said conveyer to successively traverse a filling station and a transferring station, a plurality of open ended molds mounted on said conveyer in spaced relation with the axes of said molds in substantially parallel relation and at right angles to the line of movement of said conveyer, said molds being adapted to be filled with said foodstuffs at said filling station, means synchronized with the movement of said conveyer for conveying empty cans alongside said conveyer at said transferring station each in position to receive the contents of each mold, means arranged on the side of said conveyer opposite said can conveying means and synchronized with the movement of said conveyer for pushing the contents of said molds into said cans on said can conveying means, a movable member interposed between said first conveyer and said can conveying means and engaged and moved by the foodstuffs pushed out of each mold by said pushing means and means actuated in response to the movement of said movable member for feeding an empty can to said can conveying means in position to receive the foodstuffs so pushed of each mold.

12. Apparatus for packing foodstuffs, comprising a conveyer, means for moving said conveyer to successively traverse a filling station and a transferring station, a plurality of open ended molds mounted on said conveyer in spaced relation with the axes of said molds in substantially parallel relation and at right angles to the line of movement of said conveyer, said molds being adapted to be filled with said foodstuffs at said filling station, means synchronized with the movement of said conveyer for conveying empty cans alongside said conveyer at said transferring station each in position to receive the contents of each mold, means arranged on the side of said conveyer opposite said can conveying means and synchronized with the movement of said conveyer for pushing the contents of said molds into said cans on said can conveying means, a movable member interposed between said first conveyer and said can conveying means and engaged and moved by the foodstuffs pushed out of each mold by said pushing means and means actuated in response to the movement of said movable member for feeding an empty can to said can conveying means in position to receive the foodstuffs so pushed of each mold comprising a carrier arranged on the opposite side of said can conveying means from said movable member and moved in synchronism with said conveyer and said can conveying means, a plurality of movable elements mounted on said carrier and each capable of being set to operative and inoperative positions, each of said movable elements being associated with a corresponding mold traversing said transferring station, means actuated in response to the movement of said movable member for moving said movable elements individually to said operative position and means actuated in response to those movable elements so positioned in an operative position for feeding a can to said can conveying means.

13. Apparatus for packing foodstuffs, comprising a conveyer, means for moving said conveyer to successively traverse a filling station and a transferring station, a plurality of open ended molds mounted on said conveyer in spaced relation with the axes of said molds in substantially parallel relation and at right angles to the line of movement of said conveyer, said molds being adapted to be filled with said foodstuffs at said filling station, means synchronized with the movement of said conveyer for conveying empty cans alongside said conveyer at said transferring station each in position to receive the contents of each mold, means arranged on the side of said conveyer opposite said can conveying means and synchronized with the movement of said conveyer for pushing the contents of said molds into said cans on said can conveying means, a movable member interposed between said first conveyer and said can conveying means and engaged and moved by the foodstuffs pushed out of each mold by said pushing means and means actuated in response to the movement of said movable member for feeding an empty can to said can conveying means in position to receive the foodstuffs so pushed of each mold comprising a carrier arranged on the opposite side of said can conveying means from said movable member and moved in synchronism with said conveyer and said can conveying means, a plurality of movable elements mounted on said carrier and each capable of being set to operative and inoperative positions, each of said movable elements being associated with a corresponding mold traversing said transferring station, means actuated in response to the movement of said movable member for moving said movable elements individually to said operative position, stationary means for moving each of said movable elements to its inoperative position prior to its engagement by said movable member and means actuated in response to those movable elements so positioned in an operative position for feeding a can to said can conveying means.

14. Apparatus for packing foodstuffs, comprising a conveyer, means for moving said conveyer to traverse a filling station and a transferring station, a plurality of open ended molds mounted on said conveyer in spaced relation with the axes of said molds in substantially parallel relation and at right angles to the line of movement of said conveyer, said molds being adapted to be filled with said foodstuffs at said filling station, means synchronized with the movement of said conveyer for conveying empty cans alongside said conveyer at said transferring station each in position to receive the contents of each mold, means arranged on the side of said conveyer opposite said can conveying means and synchronized with the movement of said conveyer for pushing the contents of said molds into said cans on said can conveying means, a slidable member mounted for movement in the direction of movement of said pushing means and arranged between said first conveyer and said can conveying means in position to be engaged by the foodstuffs pushed out of each mold by said pushing means, said slidable member being provided with an extension extending to the opposite side of said can conveying means, and means actuated in response to the movement of said slidable member for feeding an empty can to said can conveying means in position to receive the foodstuffs so pushed out of each mold, comprising a carrier arranged on the opposite side of said can conveying means and moved in synchronism with said conveyer and said can conveying means, a plurality of movable elements mounted on said carrier in position to be engaged by said extension each of said movable elements being associated with a corresponding mold traversing said transferring station, said movable elements being moved laterally to an operative position in response to the movement of said extension by the contents of the corresponding molds and means actuated in response to those movable elements so positioned in an operative position for feeding a can to said can conveying means.

15. Apparatus for packing foodstuffs, comprising a conveyer, means for moving said conveyer to transverse a filling station and a transferring station, a plurality of open ended molds mounted on said conveyer in spaced relation with the axes of said molds in substantially parallel relation and at right angles to the line of movement of said conveyer, said molds being adapted to be filled with said foodstuffs at said filling station, means synchronized with the movement of said conveyer for conveying empty cans alongside said conveyer at said transferring station each in position to receive the contents of each mold, means arranged on the side of said conveyer opposite said can conveying means and synchronized with the movement of said conveyer for pushing the contents of said molds into said cans on said can conveying means, a slidable member mounted for movement in the direction of movement of said pushing means and arranged between said first conveyer and said can conveying means in position to be engaged by the foodstuffs pushed out of each mold by said pushing means, said slidable member being provided with an extension extending to the opposite side of said can conveying means, and means actuated in response to the movement of said slidable member for feeding an empty can to said can conveying means in position to receive the foodstuffs so pushed out of each mold, comprising a carrier arranged on the opposite side of said can conveying means and moved in synchronism with said conveyer and said can conveying means, a plurality of movable elements mounted on said carrier in position to be engaged by said extension, each of said movable elements being associated with a corresponding mold traversing said transferring station, said movable elements being moved laterally to an operative position in response to the movement of said extension by the contents of the corresponding molds and means actuated in response to those movable elements so positioned in an operative position for feeding a can to said can conveying means comprising a star wheel having arms engaged by said movable elements when arranged in an operative position and means for feeding a can to said can conveying means in response to each part rotation of said star wheel effected by each operatively positioned movable element.

16. Apparatus for packing foodstuffs, comprising a conveyer, means for moving said conveyer to traverse a filling station and a transferring station, a plurality of open ended molds mounted on said conveyer in spaced relation with the axes of said molds in substantially parallel relation and at right angles to the line of movement of said conveyer, said molds being adapted to be filled with said foodstuffs at said filling station, means synchronized with the movement of said conveyer for conveying empty cans alongside said conveyer at said transferring station each in position to receive the contents of each mold, means arranged on the side of said conveyer opposite said can conveying means and synchronized with the movement of said conveyer for pushing the contents of said molds into said cans on said can conveying means, a slidable member mounted for movement in the direction of movement of said pushing means and arranged between said first conveyer and said can conveying means in position to be engaged by the foodstuffs pushed out of each mold by said pushing means, said slidable member being provided with an extension extending to the opposite side of said can conveying means and means actuated in response to the movement of said slidable member for feeding an empty can to said can conveying means in position to receive the foodstuffs so pushed out of each mold, comprising a carrier arranged on the opposite side of said can conveying means and moved in synchronism with said conveyer and said can conveying means, a plurality of pins mounted on said carrier in slideways extending parallel with the line of movement of said extension and in position to be engaged by said extension, each of said pins being associated with a corresponding mold traversing said transferring station, said pins being moved along said guideways to an operative position in response to the movement of said extension by the contents of the corresponding molds and means actuated in response to those pins so positioned in an operative position for feeding a can to said can conveying means, comprising a star wheel having arms engaged by said pins when arranged in an operative position and means for feeding a can to said can conveying means in response to each part rotation of said star wheel effected by each operatively positioned pin.

17. Apparatus for packing foodstuffs, comprising a frame, a horizontal transverse shaft arranged at one end of said frame, a wheel mounted on said shaft, a second wheel mounted on the opposite end of said frame to rotate about a horizontal transverse axis, a flexible endless conveyer passing around the peripheries of said wheels, a plurality of elongated open ended molds carried by said conveyer in spaced relation and projecting laterally therefrom, said molds being adapted to be filled with foodstuffs while traversing one horizontal stretch of said conveyer, means for rotating one of said wheels to move said one horizontal stretch of said conveyer toward said first wheel, a can wheel mounted on said shaft alongside said first wheel and having can pockets registering with the molds passing around said first wheel, means connecting said first wheel and said can wheel to rotate in unison, means mounted on said shaft on the opposite side of said first wheel for pushing the contents of said molds axially into the cans in said can pockets, means connecting said last pushing means and said first wheel to rotate in unison, a plate slidably mounted on said frame to move parallel with said shaft and arranged between said first wheel and said can wheel in position to be engaged by the foodstuffs pushed out of each mold by said pushing means, said plate being provided with an extension extending to the opposite side of said can conveying means, a wheel mounted on said shaft on the opposite side of said can wheel from said first wheel, means connecting said last wheel to said first wheel to rotate in unison, a plurality of movable elements mounted on said last wheel in position to be engaged by said extension, each of said movable elements being associated with a corresponding mold traversing said first wheel, said movable elements being moved laterally to an operative position in response to the movement of said extension by the contents of the corresponding molds and means actuated in response to those movable elements so positioned in an operative position for feeding a can to said can wheel.

18. Apparatus for packing foodstuffs, comprising a frame, a horizontal transverse shaft arranged at one end of said frame, a wheel mounted on said shaft, a second wheel mounted on the opposite end of said frame to rotate about a horizontal transverse axis, a flexible endless conveyer passing around the peripheries of said wheels, a plurality of elongated open ended molds carried by said conveyer in spaced relation and projecting laterally therefrom, said molds being adapted to be filled with foodstuffs while traversing one horizontal stretch of said conveyer, means for rotating one of said wheels to move said one horizontal stretch of said conveyer toward said first wheel, a can wheel mounted on said shaft alongside said first wheel and having can pockets registering with the molds passing around said first wheel, means connecting said first wheel and said can wheel to rotate in unison, means mounted on said shaft on the opposite side of said first wheel for pushing the contents of said molds axially into the cans in said can pockets, means connecting said last pushing means and said first wheel to rotate in unison, a plate slidably mounted on said frame to move parallel with said shaft and arranged between said first wheel and said can wheel in position to be engaged by the foodstuffs pushed out of each mold by said pushing means, said plate being provided with an extension extending to the opposite side of said can conveying means, a pin carrying wheel mounted on said shaft on the opposite side of said can wheel from said first wheel, means connecting said pin carrying wheel to rotate in unison with said first wheel, an annular series of pins slidably mounted on said pin carrying wheel in slideways extending parallel with the line of movement of said extension and in position to be engaged by said extension, each of said pins being associated with a corresponding mold traversing said first wheel, said pins being moved to an operative position in which they project from the outer face of said pin carrying wheel by the movement of said extension in response to the axial movement of the contents of said molds effected by said pushing means, means mounted on said frame adjacent said pin carrying wheel for moving each of said pins to its inoperative position prior to its engagement by said extension, and means actuated in response to those pins projecting from the outer face of said pin carrying wheel for feeding a can to said can wheel.

19. Apparatus for packing foodstuffs, comprising a frame, a horizontal transverse shaft arranged at one end of said frame, a wheel mounted on said shaft, a second wheel mounted on the opposite end of said frame to rotate about a horizontal transverse axis, a flexible endless conveyer passing around the peripheries of said wheels, a plurality of elongated open ended molds carried by said conveyer in spaced relation and projecting laterally therefrom, said molds being adapted to be filled with foodstuffs while traversing one horizontal stretch of said conveyer, means for rotating one of said wheels to move said one horizontal stretch of said conveyer toward said first wheel, a can wheel mounted on said shaft alongside said first wheel and having can pockets registering with the molds passing around said first wheel, means connecting said first wheel and said can wheel to rotate in unison, means mounted on said shaft on the opposite side of said first wheel for pushing the contents of said molds axially into the cans in said can pockets, means connecting said last pushing means and said first wheel to rotate in unison, a plate slidably mounted on said frame to move parallel with said shaft and arranged between said first wheel and said can wheel in position to be engaged by the foodstuffs pushed out of each mold by said pushing means, said plate being provided with an extension extending to the opposite side of said can conveying means, a pin carrying wheel mounted on said shaft on the opposite side of said can wheel from said first wheel, means connecting said pin carrying wheel to rotate in unison with said first wheel, an annular series of pins slidably mounted on said pin carrying wheel in slideways extending parallel with the line of movement of said extension and in position to be engaged by said extension, each of said pins being associated with a corresponding mold traversing said first wheel, said pins being moved to an operative position in which they project from the outer face of said pin carrying wheel by the movement of said extension in response to the axial movement of the contents of said molds effected by said pushing means, means mounted on said frame adjacent said pin carrying wheel for moving each of said pins to its inoperative position prior to its engagement by said extension, and means actuated in response to those pins projecting from the outer face of said pin carrying wheel for feeding a can to said can wheel comprising a star wheel mounted on said frame to rotate about an axis parallel with said shaft and having arms engaged by those pins projecting outwardly from the outer face of said pin carrying wheel, a can feeding wheel having can pockets corresponding in number to the arms of said star wheel and arranged to feed cans into the can pockets of said can wheel, means for connecting said star wheel and can feeding wheel to rotate in unison, and means for supplying cans to the can pockets of said can feeding wheel.

20. Apparatus for packing elongated foodstuffs such as beans and the like, comprising an endless flexible conveyer, means for supporting said conveyer to provide upper and lower generally horizontal stretches, means for continuously moving said conveyer to successively traverse a filling station along one of said stretches and a transferring station, a plurality of molds carried by said conveyer in spaced relation and adapted to be filled with said foodstuffs at said filling station, a feeding conveyer arranged parallel with and adjacent to the stretch of said first conveyer at said feeding station, means for moving said feeding conveyer in the same direction as said first conveyer at said feeding station to facilitate the transfer of said foodstuffs from said feeding conveyer to the molds carried by said first conveyer, means for discharging said foodstuffs onto said feeding conveyor in parallel relation extending transversely of the line of movement of said first and feeding conveyer to facilitate the gathering of said foodstuffs and means for emptying said molds into cans at said transferring station.

21. Apparatus for packing elongated foodstuffs such as beans and the like, comprising an endless flexible conveyer, means for supporting said conveyer to provide upper and lower generally horizontal stretches, means for continuously moving said conveyer to successively traverse a filling station along one of said stretches and a transferring station, a plurality of molds carried by said conveyer in spaced relation and adapted to be filled with said foodstuffs at said filling station, a feeding conveyer arranged parallel with and adjacent to the stretch of said first conveyer at said feeding station, means for moving said feeding conveyer in the same direction as said first conveyer at said feeding station to facilitate the transfer of said fodstuffs from said feeding conveyer to the molds carried by said first conveyer, means for discharging said foodstuffs onto said feeding conveyer in parallel relation extending transversely of the line of movement of said first and feeding conveyer to facilitate the gathering of said foodstuffs, means for driving said discharging means through power derived from said feeding conveyer, and means for emptying said molds into cans at said transferring station.

22. Apparatus for packing foodstuffs, comprising an elongated frame, a drive wheel journaled at one end of said frame to rotate about a generally horizontal transverse axis, an idler wheel journaled at the opposite end of said frame to rotate about a generally horizontal transverse axis, a flexible endless conveyer passing around the peripheries of said wheel, a plurality of molds mounted on said conveyer in spaced relation, said molds being adapted to be filled with foodstuffs while traversing one horizontal stretch of said conveyer, a motor arranged at the end of said frame adjacent said drive wheel, drive means between said motor and drive wheel to move said one horizontal stretch of said conveyer toward said drive wheel, a feeding belt drive pulley journaled on said frame adjacent said drive wheel to rotate about an axis generally parallel with the axis of said drive wheel, a feeding belt driven pulley journaled on the opposite end of said frame to rotate about an axis generally parallel with the axis of said idler wheel, a feeding belt passing around the peripheries of said pulleys and having its upper stretch arranged alongside said one horizontal stretch of said conveyer, drive means between said motor and said drive pulley to move said upper stretch of said feeding belt toward said drive pulley, a horizontal track carried by said frame and supporting said one horizontal stretch of said conveyer, a horizontal shelf projecting outwardly from said frame and supporting said upper stretch of said feeding belt, means adjacent said drive wheel for emptying said molds into cans and means for actuating said emptying means through power derived from said motor.

23. Apparatus for packing elongated foodstuffs such as beans and the like, comprising a frame, an endless flexible conveyer, means for supporting said conveyer on said frame to provide upper and lower generally horizontal stretches, means for continuously moving said conveyer to successively traverse a filling station along one of said stretches and a transferring station, a plurality of molds carried by said conveyer in spaced relation and adapted to be filled with said foodstuffs at said filling station, a feeding conveyer driving pulley mounted on said frame adjacent said transferring station to rotate about a horizontal transverse axis, a feeding belt driven pulley mounted at the opposite end of said conveyer to rotate about a horizontal transverse axis, an endless feeding belt carried by said pulleys and having its upper stretch arranged alongside the stretch of said conveyer traversing said feeding station, means for driving said driving pulley to move said upper stretch of said feeding belt toward said transferring station, means for discharging said foodstuffs in parallel relation extending transversely of the line of movement of said upper stretch of said feeding belt onto said feeding belt adjacent its said driven pulley, means for actuating said discharging means through motion derived from said driven pulley and means for emptying said molds into cans at said transferring station.

24. Apparatus for packing elongated foodstuffs such as beans and the like, comprising an elongated frame, an endless flexible conveyer, means at opposite ends of said frame and supporting said conveyer to provide upper and lower generally horizontal stretches, means for continuously moving said conveyer to successively traverse a filling station along one of said stretches and a transferring station, a plurality of molds carried by said conveyer in spaced relation and adapted to be filled with said foodstuffs at said filling station, a feeding belt driving pulley mounted on said frame adjacent said transferring station, a tiltable frame mounted on the opposite end of said first frame to swing about a horizontal axis extending lengthwise of said main frame, means for supporting said tiltable frame at any desired inclination, a shaft journaled on said tiltable frame and extending outwardly therefrom in a generally horizontal direction, a feeding belt driven pulley fast to said shaft, an endless feeding belt carried by said pulleys and having its upper stretch arranged alongside the stretch of said conveyer traversing said feeding station, means for moving said driving pulley to move said upper stretch of said feeding belt toward said transferring station, a shaft journaled on said tiltable frame and extending obliquely upward over said feeding belt, means for rotating said oblique shaft through power derived from the shaft of said driven pulley, a stationary hopper carried by said tiltable frame and surrounding said oblique shaft, said stationary hopper being provided with an opening in its bottom over said feeding belt, a rotary hopper in said stationary hopper and fast to said oblique shaft, baffle means on said rotary hopper and arranged to gather elongated foodstuffs placed therein into parallel relation and discharge said foodstuffs in such relation through said opening onto said feeding belt and means for emptying said molds into cans at said transferring station.

WILLIAM DE BACK.